(12) United States Patent
Hanson

(10) Patent No.: US 7,879,437 B2
(45) Date of Patent: Feb. 1, 2011

(54) SILICON-TRANSITION METAL REACTION PRODUCTS FOR COATING SUBSTRATES

(75) Inventor: Eric L. Hanson, Carlsbad, CA (US)

(73) Assignee: Aculon, Inc., San Diego, CA (US)

( * ) Notice: Subject to any disclaimer, the term of this patent is extended or adjusted under 35 U.S.C. 154(b) by 384 days.

(21) Appl. No.: 12/217,339

(22) Filed: Jul. 3, 2008

(65) Prior Publication Data

US 2009/0011248 A1 Jan. 8, 2009

Related U.S. Application Data

(60) Provisional application No. 60/958,584, filed on Jul. 6, 2007.

(51) Int. Cl.
*B32B 5/16* (2006.01)
(52) U.S. Cl. ............... 428/207; 428/208; 428/323; 428/423.1; 428/446; 428/447; 428/450; 528/15; 528/42
(58) Field of Classification Search .......... 428/207, 428/208, 323, 423.1, 446, 447, 450; 528/15, 528/42
See application file for complete search history.

(56) References Cited

U.S. PATENT DOCUMENTS

| | | | | |
|---|---|---|---|---|
| 2,863,891 | A | 12/1958 | Granchelli et al. | 260/429 |
| 3,013,992 | A | 12/1961 | Rust et al. | 260/2 |
| 3,772,122 | A | 11/1973 | Young | 156/329 |
| 4,780,337 | A | 10/1988 | Seyferth et al. | 427/387 |
| 5,591,797 | A | 1/1997 | Barthel et al. | 524/493 |
| 5,969,073 | A | 10/1999 | Seyferth et al. | 528/9 |
| 6,361,868 | B1 | 3/2002 | Bier et al. | 428/428 |
| 6,361,871 | B1 | 3/2002 | Jenkner et al. | 428/447 |
| 6,423,772 | B1 | 7/2002 | Zhang et al. | 524/588 |
| 6,472,062 | B1 | 10/2002 | Neerinck et al. | 428/336 |
| 6,475,329 | B1 | 11/2002 | Johnson et al. | 156/307.5 |
| 6,586,104 | B2 | 7/2003 | Matsuda et al. | 428/447 |
| 6,830,816 | B2 | 12/2004 | Mehnert et al. | 428/423.1 |
| 7,166,684 | B2 | 1/2007 | Seki et al. | 526/170 |
| 7,186,768 | B2 | 3/2007 | Korth et al. | 524/430 |
| 7,625,149 | B2 * | 12/2009 | Hanson et al. | 401/198 |
| 2004/0009344 | A1 | 1/2004 | Krienke et al. | 428/328 |
| 2005/0038183 | A1 * | 2/2005 | Ahn et al. | 524/861 |

FOREIGN PATENT DOCUMENTS

| | | |
|---|---|---|
| EP | 0 345 965 A2 | 12/1989 |
| EP | 0 496 598 A2 * | 7/1992 |
| JP | 6181201 A | 6/1994 |
| WO | WO 02/31062 A2 | 4/2002 |

OTHER PUBLICATIONS

"Siloxane Compounds of the Transition Metals" by F. Schindler and H. Schmidbauer, *Angew. Chem. Internat. Edit.*, vol. 6 (1967), No. 8, pp. 683-694.

* cited by examiner

*Primary Examiner*—Betelhem Shewareged
(74) *Attorney, Agent, or Firm*—William J. Uhl

(57) ABSTRACT

A non-particulate substrate having adhered thereto a coating composition comprising the reaction product of a transition metal compound such as niobium and a transition metal having electrons in the f orbital, and a silicon-containing material such as an organosilane or an organo(poly)siloxane. Reaction of the silicon-containing material with the transition metal compound results in a better adhering coating to the substrate than a comparable coating prepared from the silicon-containing material itself.

22 Claims, No Drawings

SILICON-TRANSITION METAL REACTION PRODUCTS FOR COATING SUBSTRATES

CROSS REFERENCE TO RELATED APPLICATION

The present application claims priority from U.S. Provisional Patent Application Ser. No. 60/958,584, filed Jul. 6, 2007.

FIELD OF THE INVENTION

The present invention relates to reaction products of transition metal compounds and silicon-containing materials and to the use of these reaction products as a coating on various substrates.

BACKGROUND OF THE INVENTION

Silicon-containing materials, particularly organosilicon-containing materials such as organosilanes and organo(poly)siloxanes, are well known for application to various substrates to modify the surface of the substrate; for example, to make the substrate more hydrophobic and easier to clean. Unfortunately, many organosilicon compounds have poor durability and do not adhere well to various substrates, which limits their usefulness. It would be desirable to take advantage of the unique properties of the silicon-containing materials by providing a method of improving their adhesion to various substrates.

SUMMARY OF THE INVENTION

The present invention provides for the use of transition metal-silicon containing reaction products as coatings for various substrates. The reaction products provide more durable, better adhering coatings than those provided by the silicon-containing materials alone. Specifically, the invention provides a non-particulate substrate having adhered thereto a coating comprising the reaction product of:
  (a) a transition metal compound, preferably a niobium compound and a transition metal compound in which the transition metal has electrons in the f orbital, and
  (b) a silicon-containing material.

The reactants (a) and (b) can be prereacted and the reaction product applied to the substrate. Alternately, (a) and (b) can be mixed together, applied to the substrate and reacted on the substrate. In still another alternate embodiment, the transition metal compound can be applied to the substrate followed by the application of the silicon-containing material. A reaction occurs on the substrate to form the desired coating.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer.

Examples of various substrates are inorganic substrates such as glass, ceramic materials such as silicon nitride, and various insulators in semi-conducting devices such as gallium arsenide, gallium nitride and silicon nitride, various metals such as iron-based substrates such as stainless steel, chromium, copper, aluminum, titanium and alloys thereof. Besides metals, metal compounds such as metal oxides are also suitable substrates. Examples of metals which form metal oxide surfaces upon exposure to ambient conditions include steels, including stainless steels, iron, and metals which acquire a non-ablating oxide coating upon exposure to the ambient environment, for example, tantalum, titanium, titanium alloys, aluminum, and aluminum alloys. Besides inorganic substrates, organic, particularly polymeric substrates, can be used. Examples of suitable polymers include polycarbonates, polyurethanes, polyesters, (meth)acrylic polymers and copolymers such as polymethyl methacrylate, polyamides such as nylon, polyimides, poly(amide-imide), polysulfones, polyolefins, polyaromatics, polyvinyl alcohol, polysaccharides, polymers derived from cellulose, polysiloxanes such as polysiloxane hard coats on polycarbonate lenses, and polymers derived from polyepoxides such as those associated with powder coatings and polymers derived from polyesters and acrylic and methacrylic copolymers such as those associated with automotive coatings. Examples of other substrates include conducting oxides, such as indium tin oxide, deposited on a glass substrate. Also, metal oxides can be deposited on polymer substrates, for example, "stacked" metal oxides on polymer substrates to provide anti-reflective properties. The substrate can be in the form of a lens, a display device such as a computer screen or a personal data assistant, a household article such as a household or kitchen appliance including coated articles and uncoated articles such as stainless steel or chrome appliances, fabrics such as upholstered furniture, industrial articles such as motor vehicles and industrial machinery.

Also, composite substrates, such as the polymers described above reinforced with an inorganic filler such as silica or alumina or organic reinforcement such as carbon fibers can be used.

The transition metal compound preferably is derived from niobium or transition metals that have electrons in the f electron orbital such as metals selected from Period 6 (lanthanide series) of the Periodic Table of elements. Examples of suitable metals include La, Hf, Ta, and W, with Ta being preferred. The ligand associated with the transition metal may be an alkoxide containing from 1 to 18, preferably 2 to 8 carbon atoms such as ethoxide, propoxide, isopropoxide, butoxide, isobutoxide and tertiary butoxide. The alkoxides may be in the form of simple esters and polymeric forms of the esters. For example, with the preferred metal Ta, the simple esters would be $Ta(OR)_5$ where R is $C_1$ to $C_{18}$ alkyl. Polymeric esters would be obtained by condensation of the alkyl esters mentioned above and typically would have the structure $RO-[Ta(OR)_3-O-]_xR$ where R is defined above and x is a positive integer. Besides alkoxides, examples of other ligands are halides, particularly chloride, acetyl acetonates, alkanolamine and lactate. Mixed ligands such as alkoxides and acetyl acetonates may also be present. $TaCl_5$ is a preferred transition metal compound.

Examples of silicon-containing materials are organosilicon-containing materials such as those having the formula:

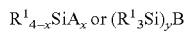

and organo(poly)siloxanes and organo(poly)silazanes containing units of the formula:

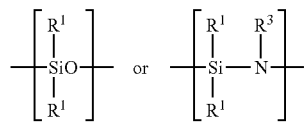

where $R^1$ are identical or different and are a hydrocarbon radical including a substituted, hydrocarbon radical such as halo, particularly fluoro-substituted hydrocarbon radical containing from 1 to 100, such as 1 to 20 carbon atoms and 1 to 12, preferably 1 to 6 carbon atoms. A in the above structural formula may be hydrogen, a halogen such as chloride, OH, $OR^2$ or

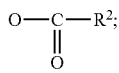

B in the above structural formula can be $NR^3{}_{3-y}$. $R^2$ is a hydrocarbon or substituted hydrocarbon radical containing from 1 to 12, typically 1 to 4 carbon atoms. $R^3$ is hydrogen or has the same meaning as $R^1$. x is 1, 2 or 3, y is 1 or 2.

Preferably, $R^1$ is a fluoro-substituted hydrocarbon. Examples of such fluoro-substituted hydrocarbons are those of the structure:

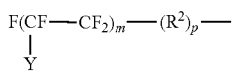

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

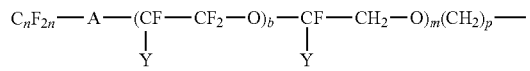

where A is an oxygen radical or a chemical bond; n is 1 to 6, y is F or $C_n$, $F_{2n}$; b is at least 1, such as 2 to 10; m is 0 to 6 and p is 0 to 18.

The organosilicon material can also be an organo(poly)siloxane or an organo(poly)silazane such as those having the structural units:

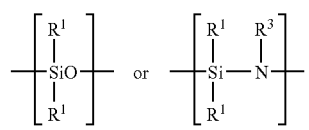

where $R^1$ is a hydrocarbon or substituted hydrocarbon having from 1 to 12, preferably 1 to 6 carbon atoms such as methyl and ethyl and $R^3$ is hydrogen or a hydrocarbon or substituted hydrocarbon having 1 to 12, preferably 1 to 6 carbon atoms. The organo(poly)siloxane may contain additional units of the formula:

where $R^5$ is a halogen such as a chloro or fluoro substituent.

The organo(poly)siloxane and organo(poly)silazane typically have a number average molecular weight of at least 400, usually between 1000 and 5,000,000.

The reaction products can be prepared by mixing the transition metal compound and the silicon-containing material in a closed system (i.e., low humidity) to avoid hydrolysis of the reactants. Reaction can occur neat or in the presence of a non-reactive solvent such as chlorinated or fluorinated solvent, for example, methylene chloride. Reaction occurs rapidly at room temperature and is complete from 1 to 30 minutes depending upon the reactants. Also, once again depending upon the reactants, heat can be used to initiate and complete the reaction. Solvent can be removed by evaporation and the reaction product can be redissolved in a suitable solvent such as an alcohol, for example, ethanol or propanol, for application to the substrate. The mole ratio of the organosilicon-containing material to transition metal compound is typically from 100:1 to 1:100, preferably from 1:1 to 10:1 depending on the valence of the transition metal compound. For example, the molar ratio of organosilicon compound to Ta(V) is typically 5 to 1.

Alternatively, the transition metal compound and the silicon-containing material can be mixed together in a suitable diluent, and prior to substantial reaction, the mixture applied to the substrate and the reactants permitted to react and complete the reaction on the substrate. Once again, depending upon the activity of the reactants, reaction can occur at room temperature or by the application of heat.

As mentioned above, the reaction product or the partially reacted reaction product or the mixture of reactants is typically applied to the substrate in an organic diluent. Examples of suitable diluents are alcohols such as methanol, ethanol and propanol, aliphatic hydrocarbons such as hexane, isooctane and decane, ethers, for example, tetrahydrofuran, and dialkylethers such as diethylether. These compositions may be applied from aqueous formulations; it is sometimes necessary to modify the ligands (e.g. by exchanging 2-ethylhexanol ligands for isopropoxide ligands) on the transition metal specie to make the resulting complex more stable.

Also, adjuvant materials may be present in the coating composition. Examples include stabilizers such as sterically hindered alcohols and acids or surfactants. Also, additional active agents may also be incorporated into the coating composition, such as antibacterial agents, anti-static compounds, lubricants, olfactory agents, etc. The adjuvants if present are present in amounts of up to 30 percent by weight based on the non-volatile content of the composition.

The concentration of the reaction product in the composition is not particularly critical but is usually at least 0.01 millimolar, typically from 0.01 to 100 millimolar, and more typically from 0.1 to 50 millimolar.

The coating composition can be obtained by mixing all of the components at the same time with low shear mixing or by combining the ingredients in several steps. The reaction product is reactive with moisture, and care should be taken that moisture is not introduced with the diluent or adjuvant materials and that mixing is conducted in a substantially anhydrous atmosphere.

The composition can be applied to the substrate surface by conventional means such as immersion coating such as dipping, rolling, spraying or wiping to form a film. The diluent is then permitted to evaporate. This can be accomplished by heating to 50-200° C. or by simple exposure to ambient temperature, that is, from 20-25° C.

For optical applications, the resulting film typically has a thickness of 0.5 to 100 nanometers. For other applications, thicker films, such as 100 to 10,000 microns, can be used.

The composition can be applied as a film or layer that is continuous or discontinuous, that is, in a pattern on the substrate surface. The composition can be applied as a primer that is overcoated with a topcoat or can be applied as a topcoat. Non-limiting examples include simply wiping a tissue impregnated with the solution across the surface, spraying the composition onto the surface of the substrate in pre-determined areas, for example, by ink-jet printing or stenciling, or by vapor deposition in vacuo. Other methods may be found by adapting printing techniques, including stamping, lithographing and gravure printing a coating solution onto the substrate in a pattern.

Besides prereacting the transition metal compound and the silicon-containing material, the transition metal compound can be applied first to the substrate followed by the application of the silicon-containing material. Both materials are typically dissolved or dispersed in organic diluent such as described above and applied to the substrate by techniques as generally described above. The concentrations of the separate materials in the diluent are at least 0.1 millimolar, typically from 0.01 to 100 millimolar, and more typically from 0.1 to 50 millimolar. Adjuvants such as those described above can be included in one or both of the dispersions or solutions. After application of a silicon-containing material, the materials, depending upon their reactivity, can react at room temperature or can be reacted by the application of heat to form the desired reaction product.

These and other aspects of the claimed invention are further illustrated by the following non-limiting examples.

EXAMPLES

Examples 1-10

Examples 1-10 show the synthesis of various reaction products of transition metal compounds and silicon-containing materials used to form coated substrates in accordance with the invention.

Example 1

Tantalum halide-perfluoroalkoxysiloxane. 810 mg 1H,1H', 2H,2H'-perfluorooctyl(triethoxy)silane (PFOSi; Gelest) was added to 125 mg $TaCl_5$ (HC Starck), and the mixture was stirred for 5 minutes in a closed scintillation vial at room temperature. Then, 5 mL $CH_2Cl_2$ (Aldrich) was added, the mixture was stirred for another 5 minutes then the solvent was removed by evaporation. The remaining product was an oily slurry, which was redissolved in 20 mL of isopropanol (Univar) before use.

Example 2

Tantalum alkoxy-perfluoroalkoxysilane. The same procedure was followed as in Example 1, except that 50 mg Ta (V) ethoxide (HC Starck) and 315 mg PFOSi were used.

Example 3

Tantalum alkoxyacetylacetonate-perfluoroalkoxysiloxane. The same procedure was followed as in Example 1, except that 92 mg Ta (V) tetra(n-butoxide) acetylacetonate (Gelest) and 612 mg PFOSi were used.

Example 4

Tantalum alkoxy-alkylsilylhalide. The same procedure was followed as in Example 1, except that 60 mg tantalum (V) ethoxide and 344 mg octadecyltrichlorosilane (ODSiCl3; Aldrich) were used.

Example 5

Tantalum halide-polyalkylsiloxane. The same procedure was followed as in Example 1, except that 130 mg $TaCl_5$ and 267 mg poly(dimethylsiloxane) (Valvoline "Pyroil" Silicone Lubricant) were used.

Example 6

Niobium alkoxide-perfluoroalkoxysiloxane. The same procedure was followed as in Example 1, except that 31 mg Nb (V) ethoxide (HC Starck) and 300 mg PFOSi were used.

Example 7

Titanium alkoxide-perfluoroalkoxysiloxane. The same procedure was followed as in Example 1, except that 33 mg Ti (IV) n-butoxide (Aldrich) and 300 mg PFOSi were used.

Example 8

Zirconium alkoxide-perfluoroalkoxysiloxane. The same procedure was followed as in Example 1, except that 38 mg Zr (IV) n-butoxide (Aldrich) and 300 mg PFOSi were used.

Example 9

Lanthanum alkoxide:perfluoroalkoxysilane. The same procedure was followed as in Example 1, except that 30 mg La (III) isopropoxide (Aldrich) and 300 mg PFOSi were used. In addition, 0.1% aqueous (27%) HCl was added to the solution mixture in order to dissolve the reaction products.

Example 10

Tungsten chloride-perfluoroalkoxysiloxane. The same procedure was followed as in Example 1, except that 40 mg W (VI) chloride (Aldrich) and 300 mg PFOSi were used.

Method of Applying Coatings:

Method 1: The transition metal and silicon compound are prereacted as in Examples 1-10. A tissue ("Kimwipe" manufactured by Kimberly Clark) impregnated with the desired transition metal-siloxane (M-Si) solution is wiped across the substrate surface for a few seconds and the solvent is allowed to dry, forming a bound M-Si film. Any excess material is wiped away with a clean tissue.

Method 2: The transition metal and silicon compounds are deposited from solution in separate steps using two impregnated tissues. After both compounds are deposited, the excess is wiped away with a clean cloth.

Examples 11-25 (Glass Substrates)

Examples 11-17 and 60-61 show the application of the reaction products of Examples 1, 2, 5-10 to glass substrates. Examples 18-25 were comparative examples in which the solutions of various silicon materials without the transition metal compound were applied to the glass substrates.

Example 11

The reaction product from Example 1 was applied to a 3"×1" borosilicate glass slide (Fisher) using method 1. Water contact angle measurements were taken initially, and after boiling in distilled water for 10 minutes. The data is listed in Table 1.

Example 12

The reaction product from Example 2 was applied to a 3"×1" borosilicate glass slide (Fisher) using method 1. Water contact angle measurements were taken initially, and after boiling in distilled water for 10 minutes. The data is listed in Table 1.

Example 13

The reaction product from Example 5 was applied to a 3"×1" borosilicate glass slide (Fisher) using method 1. Water contact angle measurements were taken initially, and after boiling in distilled water for 10 minutes. The data is listed in Table 1.

Example 14

The reaction product from Example 6 was applied to a 3"×1" borosilicate glass slide (Fisher) using method 1. Water contact angle measurements were taken initially, and after boiling in distilled water for 10 minutes. The data is listed in Table 1.

Example 15

The reaction product from Example 7 was applied to a 3"×1" borosilicate glass slide (Fisher) using method 1. Water contact angle measurements were taken initially, and after boiling in distilled water for 10 minutes. The data is listed in Table 1.

Example 16

The reaction product from Example 8 was applied to a 3"×1" borosilicate glass slide (Fisher) using method 1. Water contact angle measurements were taken initially, and after boiling in distilled water for 10 minutes. The data is listed in Table 1.

Example 18

Comparative

A 1% (w/v) solution of PFOSi in isopropanol was applied to a 3"×1" borosilicate glass slide (Fisher) using a manner similar to method 1, but without any transition metal components. Water contact angle measurements were taken initially, and after boiling in distilled water for 10 minutes. The data is listed in Table 1.

Example 19

Comparative

A 1% (w/v) solution of PFOSi in isopropanol was applied to a 3"×1" borosilicate glass slide (Fisher) using a manner similar to method 1, but without any transition metal components. The film and substrate were aged overnight in ambient conditions (74° F./50% humidity) before testing. Water contact angle measurements were taken initially, and after boiling in distilled water for 10 minutes. The data is listed in Table 1.

Example 20

Comparative

A 1% (w/v) solution of PFOSi in isopropanol was applied to a 3"×1" borosilicate glass slide (Fisher) using a manner similar to method 1, but without any transition metal components. The film and substrate were cured at 120° C. for 5 minutes before testing. Water contact angle measurements were taken initially, and after boiling in distilled water for 10 minutes. The data is listed in Table 1.

Example 21

Comparative

A 1% (w/v) solution of PFOSi and 1% (v/v) acetic acid in isopropanol was applied to a 3"×1" borosilicate glass slide (Fisher) using a manner similar to method 1, but without any transition metal components. Water contact angle measurements were taken initially, and after boiling in distilled water for 10 minutes. The data is listed in Table 1.

Example 22

Comparative

A 1% (w/v) solution of PFOSi and 1% (v/v) acetic acid in isopropanol was applied to a 3"×1" borosilicate glass slide (Fisher) using a manner similar to method 1, but without any transition metal components. The film and substrate were aged overnight in ambient conditions (74° F./50% humidity) before testing. Water contact angle measurements were taken initially, and after boiling in distilled water for 10 minutes. The data is listed in Table 1.

Example 23

Comparative

A 1% (w/v) solution of PFOSi and 1% (v/v) acetic acid in isopropanol was applied to a 3"×1" borosilicate glass slide (Fisher) using a manner similar to method 1, but without any transition metal components. The film and substrate were cured at 120° C. for 5 minutes before testing. Water contact angle measurements were taken initially, and after boiling in distilled water for 10 minutes. The data is listed in Table 1.

Example 24

Comparative

A film of "Rain-X" (Sopus Products), a commercially available poly(dimethylsiloxane) based water-repellant coating for glass was applied to a 3"×1" borosilicate glass slide (Fisher) using a manner similar to method 1, but without including any transition metal components. Water contact angle measurements were taken initially, and after boiling in distilled water for 10 minutes. The data is listed in Table 1.

Example 25

Comparative

A film of "Tekon Beta" (Tekon), a commercially available poly(methyltrifluoromethylsiloxane) based water-repellant coating for glass was applied to a 3"×1" borosilicate glass slide (Fisher) using a manner similar to method 1, but without including any transition metal components. Water contact angle measurements were taken initially, and after boiling in distilled water for 10 minutes. The data is listed in Table 1.

Examples 26-36

Stainless Steel Substrates

Examples 26-33 show application of the reaction products of Examples 1, 6, 7 and 8 to stainless steel substrates. Examples 34-36 were comparative examples in which solutions of various silicon materials without the transition metal compound were applied to the stainless steel substrates.

Example 26

The reaction product from Example 1 was applied to a 2"×2" piece of 304 stainless steel foil (McMaster-Carr) using method 1. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 27

The reaction product from Example 1 was applied to a 2"×2" piece of 304 stainless steel foil (McMaster-Carr) using method 1. The substrate and film were then heated to 120° C. for 5 minutes before testing. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 28

The reaction product from Example 6 was applied to a 2"×2" piece of 304 stainless steel foil (McMaster-Carr) using method 1. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 29

The reaction product from Example 6 was applied to a 2"×2" piece of 304 stainless steel foil (McMaster-Carr) using method 1. The substrate and film were then heated to 120° C. for 5 minutes before testing. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 30

The reaction product from Example 7 was applied to a 2"×2" piece of 304 stainless steel foil (McMaster-Carr) using method 1 Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 31

The reaction product from Example 7 was applied to a 2"×2" piece of 304 stainless steel foil (McMaster-Carr) using method 1. The substrate and film were then heated to 120° C. for 5 minutes before testing. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 32

The reaction product from Example 8 was applied to a 2"×2" piece of 304 stainless steel foil (McMaster-Carr) using method 1. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 33

The reaction product from Example 8 was applied to a 2"×2" piece of 304 stainless steel foil (McMaster-Carr) using method 1. The substrate and film were then heated to 120° C. for 5 minutes before testing. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 34

Comparative

The solution from Example 18 (1% PFOSi in isopropanol) was applied to a 2"×2" piece of 304 stainless steel foil (Mc-Master-Carr) using method 1. The substrate and film were then heated to 120° C. for 5 minutes before testing. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 35

Comparative

The solution from Example 19 (1% PFOSi/1% acetic acid in isopropanol) was applied to a 2"×2" piece of 304 stainless steel foil (McMaster-Carr) using method 1. The substrate and film were then heated to 120° C. for 5 minutes before testing. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Example 36

Comparative

The solution from Example 20 (Rain-X) was applied to a 2"×2" piece of 304 stainless steel foil (McMaster-Carr) using method 1. The substrate and film were then heated to 120° C. for 5 minutes before testing. Water contact angle measurements were taken initially, after rubbing with a microfiber cloth (Hilco Optiwipe) for 100 cycles at 150 g/cm$^2$ and after wiping with a tissue (Kimberly Clark "Kimwipe") saturated with Windex for 100 cycles at 150 g/cm$^2$. The data is listed in Table 2.

Examples 37-48

Polymer Substrates

Examples 37-44 show application of the reaction products of Examples 1-10 to polymer substrates. Example 45 was a comparative example in which a solution of the silicon-containing material without the transition metal compound was applied to the polymer substrate. Examples 46-48 used method 2 in applying the transition metal compound and the silicon-containing material to the polymer substrate.

Example 37

The reaction product from Example 1 was applied to a 2"×2" piece of a polycarbonate optical lens coated with a polysiloxane hardcoat using method 1. Water contact angle measurements were taken initially, and after abrading the surface with a microfiber cloth (Hilco Optiwipe) at 150 g/cm$^2$ for 100 cycles. The data is listed in Table 3.

Example 38

The reaction product from Example 6 was applied to a 2"×2" piece of a polycarbonate optical lens coated with a polysiloxane hardcoat using method 1. Water contact angle measurements were taken initially, and after abrading the surface with a microfiber cloth (Hilco Optiwipe) at 150 g/cm$^2$ for 100 cycles. The data is listed in Table 3.

Example 39

The reaction product from Example 7 was applied to a 2"×2" piece of a polycarbonate optical lens coated with a polysiloxane hardcoat using method 1. Water contact angle measurements were taken initially, and after abrading the surface with a microfiber cloth (Hilco Optiwipe) at 150 g/cm$^2$ for 100 cycles. The data is listed in Table 3.

Example 40

The reaction product from Example 8 was applied to a 2"×2" piece of a polycarbonate optical lens coated with a polysiloxane hardcoat using method 1. Water contact angle measurements were taken initially, and after abrading the surface with a microfiber cloth (Hilco Optiwipe) at 150 g/cm$^2$ for 100 cycles. The data is listed in Table 3.

Example 41

The reaction product from Example 4 was applied to a 2"×2" piece of a polycarbonate optical lens coated with a polysiloxane hardcoat using method 1. Water contact angle measurements were taken initially, and after abrading the surface with a microfiber cloth (Hilco Optiwipe) at 150 g/cm$^2$ for 100 cycles. The data is listed in Table 3.

Example 42

The reaction product from Example 5 was applied to a 2"×2" piece of a polycarbonate optical lens coated with a polysiloxane hardcoat using method 1. Water contact angle measurements were taken initially, and after abrading the surface with a microfiber cloth (Hilco Optiwipe) at 150 g/cm$^2$ for 100 cycles. The data is listed in Table 3.

Example 43

The reaction product from Example 2 was applied to a 2"×2" piece of a polycarbonate optical lens coated with a polysiloxane hardcoat using method 1. Water contact angle measurements were taken initially, and after abrading the surface with a microfiber cloth (Hilco Optiwipe) at 150 g/cm$^2$ for 100 cycles. The data is listed in Table 3.

Example 44

The reaction product from Example 3 was applied to a 2"×2" piece of a polycarbonate optical lens coated with a polysiloxane hardcoat using method 1. Water contact angle measurements were taken initially, and after abrading the surface with a microfiber cloth (Hilco Optiwipe) at 150 g/cm$^2$ for 100 cycles. The data is listed in Table 3.

Example 45

Comparative

A coating of poly(dimethysiloxane) (PDMS) was applied to a 2"×2" piece of a polycarbonate optical lens coated with a polysiloxane hardcoat by spraying the surface with "Pyroil Silicone Lubricant" (Valvoline), allowing the solvent (heptane) to dry and removing any excess with a microfiber cloth (Hilco Optiwipe). Water contact angle measurements were taken initially, and after abrading the surface with a microfiber cloth (Hilco Optiwipe) at 150 g/cm$^2$ for 100 cycles. The data is listed in Table 3.

Example 46

Using method 2, a solution of 31 mg TaCl$_5$ in 10 mL isopropanol followed by deposition of a PDMS solution (as in Example 34) using tissues (Kimberly Clark) were applied to a 2"×2" piece of a polycarbonate optical lens coated with a polysiloxane hardcoat. Any visible residues were removed using a microfiber cloth (Hilco Optiwipe). Water contact angle measurements were taken initially, and after abrading the surface with a microfiber cloth (Hilco Optiwipe) at 150 g/cm$^2$ for 100 cycles. The data is listed in Table 3.

Example 47

Using method 2, a solution of 41 mg Ta (V) ethoxide in 10 mL isopropanol followed by deposition of a PDMS solution (as in Example 34) using tissues (Kimberly Clark) were applied to a 2"×2" piece of a polycarbonate optical lens coated with a polysiloxane hardcoat. Any visible residues were removed using a microfiber cloth (Hilco Optiwipe). Water contact angle measurements were taken initially, and after abrading the surface with a microfiber cloth (Hilco Optiwipe) at 150 g/cm$^2$ for 100 cycles. The data is listed in Table 3.

Example 48

Using method 2, a solution of 42 mg Ta (V) tetra(n-ethoxide) acetylacetonate in 10 mL isopropanol followed by deposition of a PDMS solution (as in Example 34) using tissues (Kimberly Clark) were applied to a 2"×2" piece of a polycarbonate optical lens coated with a polysiloxane hardcoat. Any visible residues were removed using a microfiber cloth (Hilco Optiwipe). Water contact angle measurements were taken initially, and after abrading the surface with a microfiber cloth (Hilco Optiwipe) at 150 g/cm$^2$ for 100 cycles. The data is listed in Table 3.

Examples 49-55

Other Substrates

Examples 49-55 show application of the reaction product of Example 1 to various substrates.

Example 49

The reaction product from Example 1 was applied to a 4"×1" piece of poly(methylmethacrylate) (Optix "Plaskolite") (PMMA) using method 1. Water contact angle measurements were taken initially, and after abrading the surface with a microfiber cloth (Hilco Optiwipe) at 150 g/cm$^2$ for 100 cycles. The data is listed in Table 4.

Example 50

The reaction product from Example 1 was applied to a 2"×2" piece of galvanized steel coated with a black paint layer and a clear, urethane-based topcoat using method 1. Water contact angle measurements were taken initially, and after abrading the surface with a microfiber cloth (Hilco Optiwipe) at 150 g/cm$^2$ for 100 cycles. The data is listed in Table 4.

Example 51

The reaction product from Example 1 was applied to a 2"×2" piece of aluminum alloy coated with a layer of clear power epoxy using method 1. Water contact angle measurements were taken initially, and after abrading the surface with a microfiber cloth (Hilco Optiwipe) at 150 g/cm$^2$ for 100 cycles. The data is listed in Table 4.

Example 52

The reaction product from Example 1 was applied to a 3"×1" piece of polysulfone using method 1. Water contact angle measurements were taken initially, and after abrading the surface with a microfiber cloth (Hilco Optiwipe) at 150 g/cm$^2$ for 100 cycles. The data is listed in Table 4.

Example 53

The reaction product from Example 1 was applied to a CR-39 lens blank (Ce-Tru) using method 1. Water contact angle measurements were taken initially, and after abrading the surface with a microfiber cloth (Hilco Optiwipe) at 150 g/cm$^2$ for 100 cycles. The data is listed in Table 4.

Example 54

The reaction product from Example 1 was applied to a polycarbonate (no hardcoat) lens blank using method 1. Water contact angle measurements were taken initially, and after abrading the surface with a microfiber cloth (Hilco Optiwipe) at 150 g/cm$^2$ for 100 cycles. The data is listed in Table 4.

Example 55

The reaction product from Example 1 was applied to the (interior) display screen of a Motorola Razr using method 1. Water contact angle measurements were taken initially, and after abrading the surface with a microfiber cloth (Hilco Optiwipe) at 150 g/cm$^2$ for 100 cycles. The data is listed in Table 4.

Examples 56-59

Polymethylmethacrylate

Examples 56-59 show application of the reaction products of Examples 7, 8, 9 and 10 to a polymethylmethacrylate substrate.

Example 56

The reaction product from Example 9 was applied to a 4"×1" piece of poly(methylmethacrylate) (Optix "Plaskolite") using method 1. Water contact angle measurements were taken initially, and after abrading the surface with a microfiber cloth (Hilco Optiwipe) at 150 g/cm$^2$ for 100 cycles. The data is listed in Table 4.

Example 57

The reaction product from Example 10 was applied to a 4"×1" piece of poly(methylmethacrylate) (Optix "Plaskolite") using method 1. Water contact angle measurements were taken initially, and after abrading the surface with a microfiber cloth (Hilco Optiwipe) at 150 g/cm² for 100 cycles. The data is listed in Table 4.

Example 58

The reaction product from Example 7 was applied to a 4"×1" piece of poly(methylmethacrylate) (Optix "Plaskolite") using method 1. Water contact angle measurements were taken initially, and after abrading the surface with a microfiber cloth (Hilco Optiwipe) at 150 g/cm² for 100 cycles. The data is listed in Table 4.

Example 59

The reaction product from Example 8 was applied to a 4"×1" piece of poly(methylmethacrylate) (Optix "Plaskolite") using method 1. Water contact angle measurements were taken initially, and after abrading the surface with a microfiber cloth (Hilco Optiwipe) at 150 g/cm² for 100 cycles. The data is listed in Table 4.

Example 60

The reaction product from Example 9 was applied to a 3"×1" borosilicate glass slide (Fisher) using method 1. Water contact angle measurements were taken initially, and after boiling in distilled water for 10 minutes. The data is listed in Table 1.

Example 61

The reaction product from Example 10 was applied to a 3"×1" borosilicate glass slide (Fisher) using method 1. Water contact angle measurements were taken initially, and after boiling in distilled water for 10 minutes. The data is listed in Table 1.

TABLE 1

Coatings on Glass

| Example # | Coating | Initial W.C.A. | W.C.A. after boiling water/10 min |
|---|---|---|---|
| Control | none | 25 | — |
| 1 | TaCl5:PFOSi | 112 | 105 |
| 12 | Ta(EtO)5:PFOSi | 100 | 106 |
| 13 | TaCl5:PDMS | 103 | 92 |
| 14 | Nb(EtO)5:PFOSi | 99 | 99 |
| 15 | Ti(n-BuO)4:PFOSi | 107 | 67 |
| 16 | Zr(n-BuO)4:PFOSi | 94 | 66 |
| 18 | PFOSi | 66 | 30 |
| 19 | PFOSi | 78 | 37 |
| 20 | PFOSi | 76 | 34 |
| 21 | PFOSi | 85 | 50 |
| 22 | PFOSi | 74 | 35 |
| 23 | PFOSi | 74 | 40 |
| 24 | Rain-X | 106 | 81 |
| 25 | Tekon-Beta | 105 | 70 |
| 60 | La(iPrO)3:PFOSi | 116 | 116 |
| 61 | WCl6:PFOSi | 112 | 108 |

TABLE 2

Coatings on Stainless Steel

| Example # | Coating | Initial W.C.A. | W.C.A. after rubbing w/microfiber 100x | W.C.A. after rubbing w/Windex 100x |
|---|---|---|---|---|
| Control | none | 60 | — | — |
| 26 | TaCl5:PFOSi | 110 | 115 | 110 |
| 27 | TaCl5:PFOSi | 114 | 110 | 112 |
| 28 | Nb(EtO)5:PFOSi | 110 | 104 | 110 |
| 29 | Nb(EtO)5:PFOSi | 125 | 108 | 105 |
| 30 | Ti(n-BuO)4:PFOSi | 105 | 91 | 106 |
| 31 | Ti(n-BuO)4:PFOSi | 112 | 98 | 106 |
| 32 | Zr(n-BuO)4:PFOSi | 115 | 112 | 112 |
| 33 | Zr(n-BuO)4:PFOSi | 114 | 110 | 112 |
| 34 | PFOSi | 100 | 93 | 84 |
| 35 | PFOSi | 102 | 95 | 85 |
| 36 | Rain-X | 85 | 87 | 82 |

TABLE 3

Coatings on Polymers

| Example # | Coating | Initial W.C.A. | W.C.A. after rubbing w/microfiber 100x |
|---|---|---|---|
| Control | none | 78 | — |
| 37 | TaCl5:PFOSi | 116 | 110 |
| 38 | Nb(EtO)5:PFOSi | 105 | 103 |
| 39 | Ti(n-BuO)4:PFOSi | 105 | 94 |
| 40 | Zr(n-BuO)4:PFOSi | 109 | 101 |
| 41 | Ta(EtO)5:ODSiCl3 | 105 | 102 |
| 42 | TaCl5:PDMS | 108 | 104 |
| 43 | Ta(EtO)5:PFOSi | 114 | 106 |
| 44 | Ta(EtO)4acac:PFOSi | 111 | 100 |
| 45 | PDMS | 86 | 88 |
| 46 | TaCl5:PDMS | 111 | 111 |
| 47 | Ta(EtO)5:PDMS | 111 | 110 |
| 48 | Ta(EtO)4acac:PDMS | 97 | 97 |

TABLE 4

Other Surfaces

| Example # | Coating | Initial W.C.A. | W.C.A. after rubbing w/microfiber 100x |
|---|---|---|---|
| PMMA (Control) | none | 76 | — |
| 49 | TaCl5:PFOSi | 113 | 108 |
| urethane clear coat (Control) | none | 88 | — |
| 50 | TaCl5:PFOSi | 114 | 108 |
| epoxy powder coat (Control) | none | 89 | — |
| 51 | TaCl5:PFOSi | 113 | 110 |
| Polysulfone (Control) | none | 70 | — |
| 52 | TaCl5:PFOSi | 110 | 108 |
| CR-39 (Control) | none | 75 | — |
| 53 | TaCl5:PFOSi | 111 | 102 |
| Polycarbonate (Control) | none | 90 | — |
| 54 | TaCl5:PFOSi | 114 | 114 |
| "Razr" display (Control) | none | 68 | — |
| 55 | TaCl5:PFOSi | 111 | 112 |
| 56 (PMMA) | La(iPrO)3:PFOSi | 109 | 106 |
| 57 (PMMA) | WCl6:PFOSi | 112 | 106 |
| 58 (PMMA) | Ti(n-BuO)4:PFOSi | 108 | 90 |
| 59 (PMMA) | Zr(n-BuO)4:PFOSi | 100 | 89 |

Whereas particular embodiments of this invention have been described above for purposes of illustration, it will be evident to those skilled in the art that numerous variations of the details of the present invention may be made without departing from the invention as defined in the appended claims.

What is claimed is:

1. A non-particulated substrate having adhered thereto a coating comprising the reaction product of:
   (a) a transition metal compound in which the transition metal is selected from niobium and transition metals having electrons in the f orbital and in which the transition metal compound has ligands selected from alkoxide, halide, keto acid, amine and acylate,
   (b) a silicon-containing material.

2. The coated substrate of claim 1 in which the substrate is selected from an organic material and an inorganic material.

3. The coated substrate of claim 1 in which the substrate is selected from a polymeric material, a metal, a metal oxide and a metal alloy.

4. The coated substrate of claim 3 in which the polymeric material is selected from polycarbonate, polyurethane, polyester, acrylic polymers and copolymers, polyamides, polyimides, poly(amide-imide), polysulfones, polymers derived from polyepoxides, polysiloxanes, polyolefins, polyaromatics, polyvinyl alcohol, polysaccharides and polymers derived from cellulose.

5. The coated substrate of claim 3 in which the polymeric material is reinforced with an inorganic material or an organic material.

6. The coated substrate of claim 3 in which the metal and the metal of the metal oxide is selected from iron, chromium, copper, aluminum and titanium and alloys thereof.

7. The coated substrate of claim 1 in which the transition metal of the transition metal compound is selected from those of Period 6 of the Periodic Table of Elements.

8. The coated substrate of claim 1 in which the transition metal is selected from La, Hf, Ta, W and Nb.

9. The coated substrate of claim 1 in which the ligand of the transition metal compound is a chloride.

10. The coated substrate of claim 1 in which the silicon-containing material has a formula selected from:

$$R^1_{4-x}SiA_x \text{ or } (R^1_3Si)_y B$$

or an organo(poly)siloxane and an organo(poly)silazane containing units of the formula:

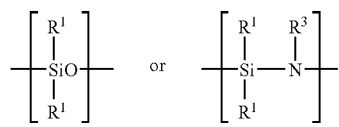

where:
R¹ are identical or different and are a hydrocarbon or substituted hydrocarbon radical containing from 1 to 100 carbon atoms,
A is hydrogen, halogen, OH, OR² or

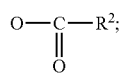

B is $NR^3_{3-y}$;
R² is a hydrocarbon or substituted hydrocarbon radical containing from 1 to 12 carbon atoms,
R³ is hydrogen or is the same as R¹,
x is 1, 2 or 3,
y is 1 or 2.

11. The coated substrate of claim 10 in which the silicon-containing material has the following formula:

where R¹ is a fluoro-substituted hydrocarbon and A is OR².

12. The coated substrate of claim 11 in which R¹ is of the structure:

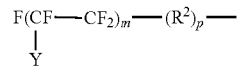

where Y is F or $C_nF_{2n+1}$; m is 4 to 20 and n is 1 to 6; R² is alkyl containing from 1 to 4 carbon atoms and p is 0 to 18.

13. The coated substrate of claim 11 in which the fluoro-substituted hydrocarbon is of the structure:

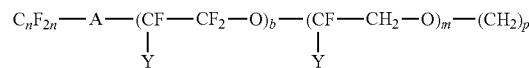

where A is an oxygen radical or a chemical bond; n is 1 to 6; Y is F or $C_nF_{2n+1}$; b is at least 1; m is 0 to 6 and p is 0 to 18.

14. The coated substrate of claim 1 in which the silicon material is an organo(poly)siloxane or an organo(poly)silazane.

15. The coated substrate of claim 14 in which the organo(poly)siloxane and organo(poly)silazane have units of the formula:

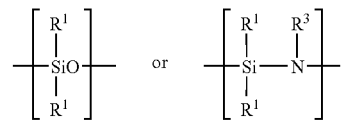

where R¹ are identical or different and are hydrocarbon or substituted hydrocarbon radicals containing 1 to 12 carbon atoms and R³ is hydrogen or is the same as R¹.

16. The coated substrate of claim 15 in which the organo(poly)siloxane contains additional units of the formula:

where R⁵ contains a halogen.

17. The coated substrate of claim 16 in which the halogen is F or Cl.

18. The coated substrate of claim 14 in which the organo(poly)siloxane and organo(poly)silazane have a number average molecular weight of at least 400.

19. The coated substrate of claim 18 in which the organo(poly)siloxane has a number average molecular weight of 1000 to 5,000,000.

20. The coated substrate of claim 1 in which the coating contains an adjuvant material selected from an antistatic agent, an antibacterial agent and a lubricant.

21. The coated substrate of claim 1 in which the substrate is selected from a previously coated metal, metal oxide, metal alloy or polymeric substrate.

22. The coated substrate of claim 1 in the form of a lens, a display device, a household appliance, a motor vehicle, industrial machinery, and fabric.

* * * * *